(12) United States Patent
Ie et al.

(10) Patent No.: US 8,219,805 B1
(45) Date of Patent: Jul. 10, 2012

(54) APPLICATION IDENTIFICATION

(75) Inventors: William Ie, Mountain View, CA (US);
Sunil C. Agrawal, Milpitas, CA (US)

(73) Assignee: Adobe Systems Incorporated, San Jose, CA (US)

(*) Notice: Subject to any disclaimer, the term of this patent is extended or adjusted under 35 U.S.C. 154(b) by 1160 days.

(21) Appl. No.: 12/001,497

(22) Filed: Dec. 11, 2007

(51) Int. Cl.
*H04L 29/06* (2006.01)
(52) U.S. Cl. ............. 713/157; 380/30; 713/156
(58) Field of Classification Search ............. 713/157
See application file for complete search history.

(56) References Cited

U.S. PATENT DOCUMENTS

| | | | | |
|---|---|---|---|---|
| 5,721,781 | A * | 2/1998 | Deo et al. | 705/67 |
| 7,571,314 | B2 * | 8/2009 | Lortz | 713/157 |
| 7,752,140 | B1 * | 7/2010 | Xu et al. | 705/59 |
| 2002/0147905 | A1 * | 10/2002 | Perlman | 713/157 |

OTHER PUBLICATIONS

Housley, et al., *Internet X509 Public Key Infrastructure Certificate and Certificate Revocation List (CRL) Profile*, RFC 3280, 127 pages, Apr. 2002.

*Tutorial Introduction Digital Certificates PKI Guide Encryption Signing Signature*, Verisign, www.verisign.com.au/repository/tutorial/digital/introl.shtml, 5 pages, printed from Web on Dec. 2, 2007.
*Certificates and Certificate Authorities*, Chapter 6-10.6—Fundamental Security Concepts, http://ccfit.nsu.ru/~ilya/grid/manuals/globus/tutorial/ch10s04.html, 3 pages, printed from Web on Dec. 2, 2007.

* cited by examiner

*Primary Examiner* — Kambiz Zand
*Assistant Examiner* — Dant Shaifer Harriman
(74) *Attorney, Agent, or Firm* — Fish & Richardson P.C.

(57) ABSTRACT

Methods, systems, and apparatus, including medium-encoded computer program products, for identifying applications. In general, in one aspect, a method includes: obtaining a first certificate chain from certificates corresponding to a digitally signed application, and a second certificate chain from a successful validation of the digital signature using the certificates; and generating an identifier for the application based on one or more certificate owner names found in both the first certificate chain and the second certificate chain. Generating the identifier for the application can include finding a location in one of the first and second certificate chains that corresponds to a root of the other of the first and second certificate chains, and comparing the one or more certificate owner names found in both the first certificate chain and the second certificate chain, starting or ending with the root and the location.

25 Claims, 3 Drawing Sheets

APPLICATION IDENTIFICATION

BACKGROUND

The present disclosure relates to identifying applications to be run in computing systems.

Various techniques have been employed to accurately identify software applications to be run in computing systems. For example, GUIDs (Globally Unique Identifiers) have been used for applications, where a GUID is simply a number assigned to an application in such a manner that it is guaranteed to be different from all other GUIDs. In many cases, however, such GUIDs can be readily stolen, and other applications can claim to be the same application by providing the same GUID. To add cryptographic security to an application identifier, the Flash® player (available from Adobe Systems Inc. of San Jose, Calif.) includes support to identify an application based on the hash of the SWF (Shockwave Flash) making up the application. In this case, when the application changes, the hash identifier can change also, even if the application change is only a minor update to the code.

SUMMARY

This specification describes technologies relating identifying applications to be run in computing systems.

In general, one aspect of the subject matter described in this specification can be embodied in a method that includes obtaining a first certificate chain from certificates corresponding to a digitally signed application, and a second certificate chain from a successful validation of the digital signature using the certificates; and generating an identifier for the application based on one or more certificate owner names found in both the first certificate chain and the second certificate chain. Other embodiments of this aspect include corresponding systems, apparatus, and computer program products.

These and other embodiments can optionally include one or more of the following features. Generating the identifier for the application can include finding a location in one of the first and second certificate chains that corresponds to a root of the other of the first and second certificate chains. Generating the identifier for the application can include comparing the one or more certificate owner names found in both the first certificate chain and the second certificate chain, starting or ending with the root and the location. Finding the location can include finding a certificate in the one certificate chain having public key information matching that found in the root of the other certificate chain.

Generating the identifier for the application can include using the first certificate chain to generate the identifier. Generating the identifier for the application can include combining the one or more certificate owner names with public key information corresponding to a root of the first certificate chain. Generating the identifier for the application can include combining public key information corresponding to a root of the first certificate chain, the one or more certificate owner names and an application name assigned to the application. Moreover, the method and computer operations can include saving the identifier for use in identifying the application at a later time, such as for use in identifying the application for application services provided by a cross-operating system runtime environment.

Other embodiments include corresponding systems, apparatus and computer-readable media encoding computer program products operable to cause data processing apparatus to perform the operations described. For example, a system can include a user interface device and one or more computers operable to interact with the user interface device and to perform operations. The one or more computers can include a cross-operating system runtime environment. Moreover, the one or more computers can include one personal computer, and the personal computer can include the user interface device.

Particular embodiments of the subject matter described in this specification can be implemented to realize one or more of the following advantages. A solution for identifying applications can be provided that is cryptographically strong, survives application updates, and is relatively long lived. Other applications can be prevented from stealing another application's identifier. The application identifier can be based on X.509 credentials, but the application identifier need not change when a X.509 credential is reissued. The application identifiers can be used in a cross-platform runtime environment, and application authors and publishers can ensure that only their applications are used with specific network feeds, to make sure that any author or publisher requirements are met (e.g., that appropriate advertisements are shown along with delivered media content or that relevant use statistics are correctly gathered).

The details of one or more embodiments of the invention are set forth in the accompanying drawings and the description below. Other features, aspects, and advantages of the invention will become apparent from the description, the drawings, and the claims.

DETAILED DESCRIPTION

A software application (which for brevity will simply be referred to as an application) does not necessarily correspond to a file. An application may be stored in a portion of a file that holds other information, in a single file dedicated to the application in question, or in multiple coordinated files (which can be both local and remote).

Figure 1:
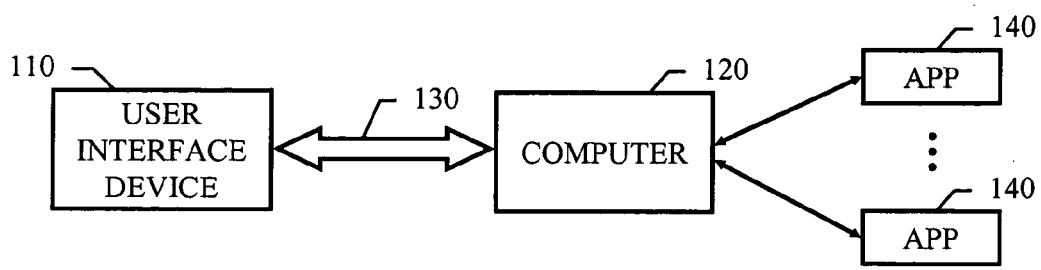
FIG. 1 shows a general system in which applications are identified.

FIG. 1 shows a general system in which applications are identified. A user interface device (110) is communicatively coupled with one or more computers (120) through a channel (130). The channel (130) can include wired or wireless channels, one or more internal computer system busses, one or more computer networks, or combinations thereof. The user interface device (110) can be a mobile device (e.g., a cell phone or laptop computer), and the computer(s) (120) can be separate from the user interface device (110) (e.g., server computers accessible over a network) or integrated with the user interface device (110) (e.g., a personal computer having the computer (120) and the user interface device (110) included therein).

The computer (120) has associated applications (140) that need to be identified so as to be distinguishable from each other. The computer (120) can create identifiers for the applications (140) using associated digital signatures and certificates. In particular, certificate owner names (e.g., certificate subjects, distinguished names, alternative names or Domain Name Service (DNS) entries) can be used in generating the application identifiers. This can make the application identifies more robust, allowing them to survive changes to the digital certificates used with the applications (140). Note that, typically, when a Certificate Authority (CA) (e.g., VeriSign, Inc. of Mountain View, Calif.) reissues a certificate (e.g., in case of certificate expiry), the new certificate identifies the certificate owners (and thus the application author) the same way as before.

Figure 2:
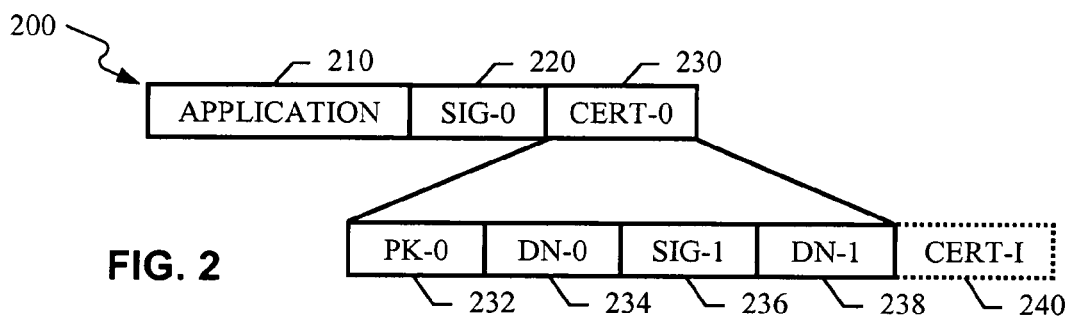
FIG. 2 shows an example signed application.

FIG. 2 shows an example signed application (200). In this example, an application (210) includes a digital signature SIG-0 (220) and digital certificate CERT-0 (230) attached thereto. As will be appreciated, the digital certificates described here can be included within the application's digital signature, but are shown separately in the drawing for the purpose of clarity. The certificate (230) can include within it a public key (232) (which corresponds to SIG-0), a distinguished name (234) (which corresponds to the signer for SIG-0), an additional digital signature (236) (SIG-1), and a distinguished name (238) (which corresponds to the signer for SIG-1). As will be appreciated, any number of additional digital certificates (240) can be attached to the signed application (200), forming a chain of certificates created when the application (210) was originally signed (e.g., by the application publisher). This chain of certificates can be used in creating an identifier for the application (210), which identifier can be used in a computing system for a number of different purposes. Note that in many scenarios, an embedded certificate chain will be the typical situation.

Figure 3:
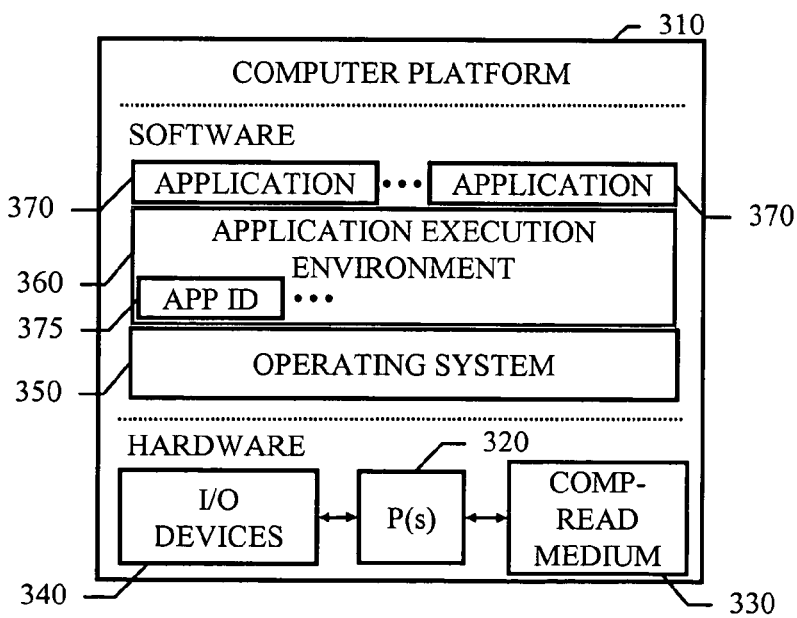
FIG. 3 shows an example computer system in which applications are identified.

For instance, FIG. 3 shows an example computer system in which applications are identified. A computer platform (310) includes both hardware and software. The hardware includes input/output devices (340), one or more processors (320) and at least one computer readable medium (330) (e.g., memory device(s), a storage device(s), or combinations of one or more of them). The software can include an operating system (OS) (350) on which the software elements of the computer platform (310) operate. In addition, an application execution environment (360) can use the operating system (350) to interact with other elements of the computer platform (310). The application execution environment (360) can provide various utility services for use by applications that run in the application execution environment. These utility services can include file system access, window and menuing, integration with the OS shell (e.g., WINDOWS® OS Explorer or MAC® OS Finder), file extension registration, document processing support (e.g., Hypertext Markup Language (HTML) and Portable Document Format (PDF) engines), string manipulation, graphics, networking, notification facilities, addressing peripherals, or other types of functionality that can be provided using a runtime library. Moreover, the application execution environment (360) can include a cross-platform application program interface (API) that provides services to applications (370) that run in the application execution environment (360) and serves to abstract away details of the various hardware and OS platforms on which the application execution environment program (360) has been designed to run.

The application execution environment (360) can be a cross-OS runtime environment, such as the Adobe® Integrated Runtime (AIR™) software, provided by Adobe Systems Inc. of San Jose, Calif. In some implementations, the application execution environment (360) can load an application (370) from an encoded representation of the application (370). For example, the encoded representation can have a predefined syntactic structure such as a programming language (e.g., source code) or can include well defined virtual instructions (e.g., platform-independent bytecode, such as Macromedia Flash® bytecode). To load such applications, the application execution environment (360) can decode the encoded representation of the application (370) into instructions and can execute the instructions of the application.

In addition, the application execution environment (360) can create application identifiers (375) for the applications (370) using the digital signatures associated therewith. These application identifiers (375) can be relatively long lived (e.g., 3-5 years, or more), allowing further feature development within the application execution environment (360) based on the application identifiers (375). For example, the application identifiers (375) can be used to facilitate inter-application communications, to provide application-specific secure storage in the computer platform (310), or to support a generic installer mechanism for applications to be installed on the application execution environment (360).

The application identifiers (375) can be used for other purposes as well, such as to identify an application that plays media content subject to digital rights management (DRM) requirements. Such an application can be confirmed as authentic and uniquely identified using the techniques described herein before media content or decryption key(s) are delivered to the application. Note that the application identifiers (375) should generally be consistent from one computing machine to another, and the author or publisher of the applications (370) should have control over their respective application identifiers (375). Creating the application identifiers (375) based on certificate chains associated with the applications (370), as described herein, can satisfy both of these goals.

Figure 4:
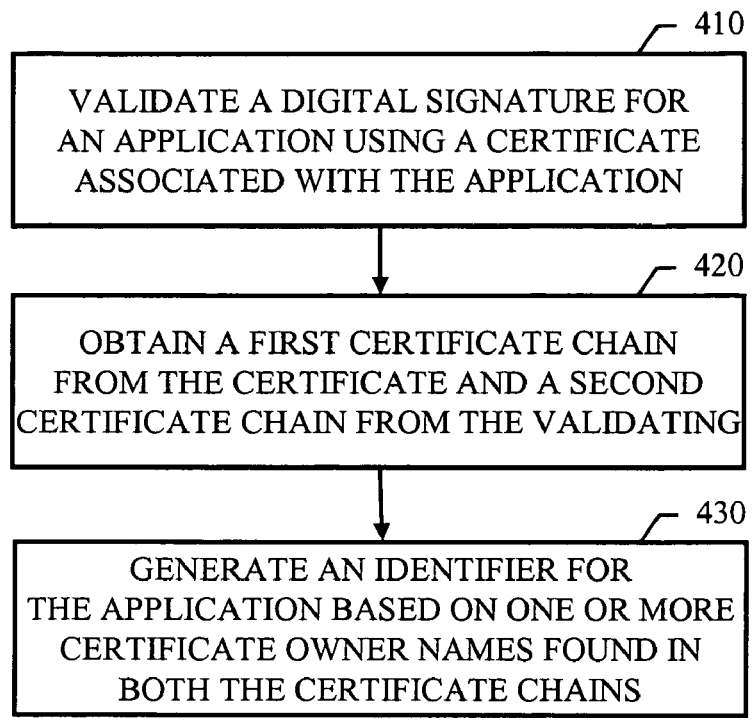
FIG. 4 shows an example process of creating an application identifier.

FIG. 4 shows an example process of creating an application identifier. A digital signature for an application can be validated using certificates associated with the digital signature, which is associated with the application (410). The signature validation can ensure that the signed application bits haven't been modified and that the singer's certificate chains up to a trusted root in the user's computing system. The signature validation can be performed by the same machine or process that generates the application identifier, such as the application execution environment (360), by a different machine or process, or a combination of these.

A first certificate chain can be obtained from the certificates and signature associated with the application, and a second certificate chain can be obtained from the result of the validation processes (420). Then, an identifier can be generated for the application based on one or more certificate owner names found in both the first and second certificate chains (430). Generating the identifier can involve processing (e.g., hashing) one or more portions of certificates in the first certificate chain to form the identifier or a portion of the identifier. Obtaining the certificate chains can involve receiving the certificate chains from another machine or process, or building one or both of the certificate chains. For example, the first certificate chain can be created based on the certificates attached to the digital signature; the second certificate chain can be created based on the validation done locally; and the two chains can be reconciled, to ensure that one is a subset of the other, before the application identifier is created based on the first certificate chain.

Figure 5:
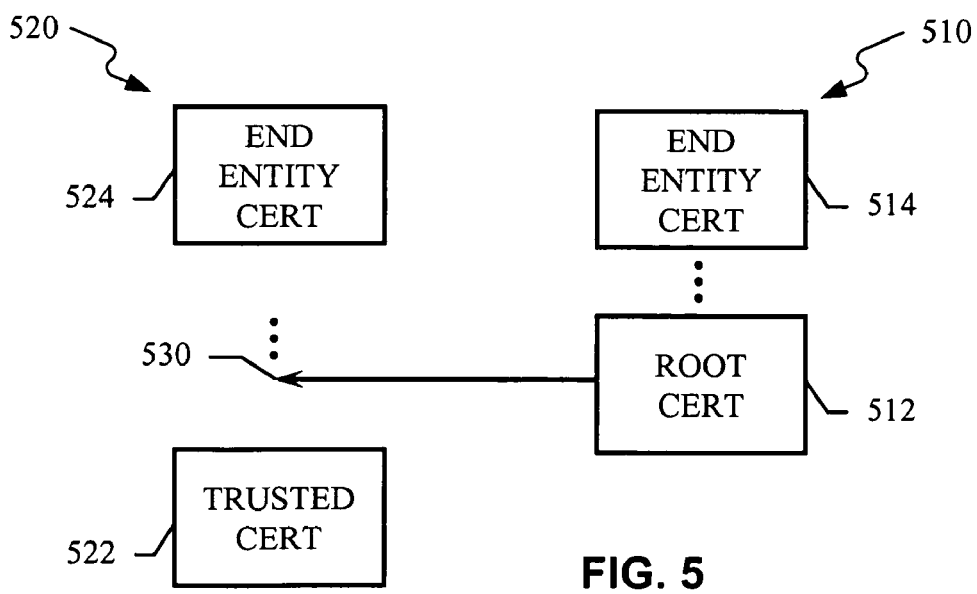
FIG. 5 shows an example portion of a process of creating an application identifier.

To reconcile the two chains and confirm the certificate owner names to be used, a location in the second certificate chain can be found, which location corresponds to a root of the first certificate chain. FIG. 5 shows an example portion of a process of creating an application identifier. A first certificate chain (510) represents the certificate chain computed using the certificates embedded in the application's signature (the "received" certificate chain). This received certificate chain (510) begins with a root certificate (512) and ends with an end entity certificate (514). In addition, a second certificate chain (520) represents the certificate chain computed during the signature validation (the "validated" certificate chain). This validated certificate chain (520) begins with a trusted root certificate (522) and ends with an end entity certificate (524).

The validated certificate chain (520) can have a different root certificate than the received certificate chain (510) because the received certificate chain (510) may have a root certificate that is trusted indirectly, such as via cross-certification. Thus, before the application identifier can be generated, a location (530) can be found in the validated certificate chain (520), which location (530) corresponds to the root certificate (512) in the received certificate chain (510). This can be done by looking for the certificate in the validated chain (520) with the same public key hash as that of the root certificate (512) in the received chain (510). Once the location (530) has been found, the owner names can be checked in the certificate chains (510, 520), and the application identifier can be generated. It should be noted that the reverse scenario is also possible, where the validated certificate chain is a proper subset of the received certificate chain, in which case, the location in the received chain that corresponds to the root of the validated chain is found.

Figure 6:
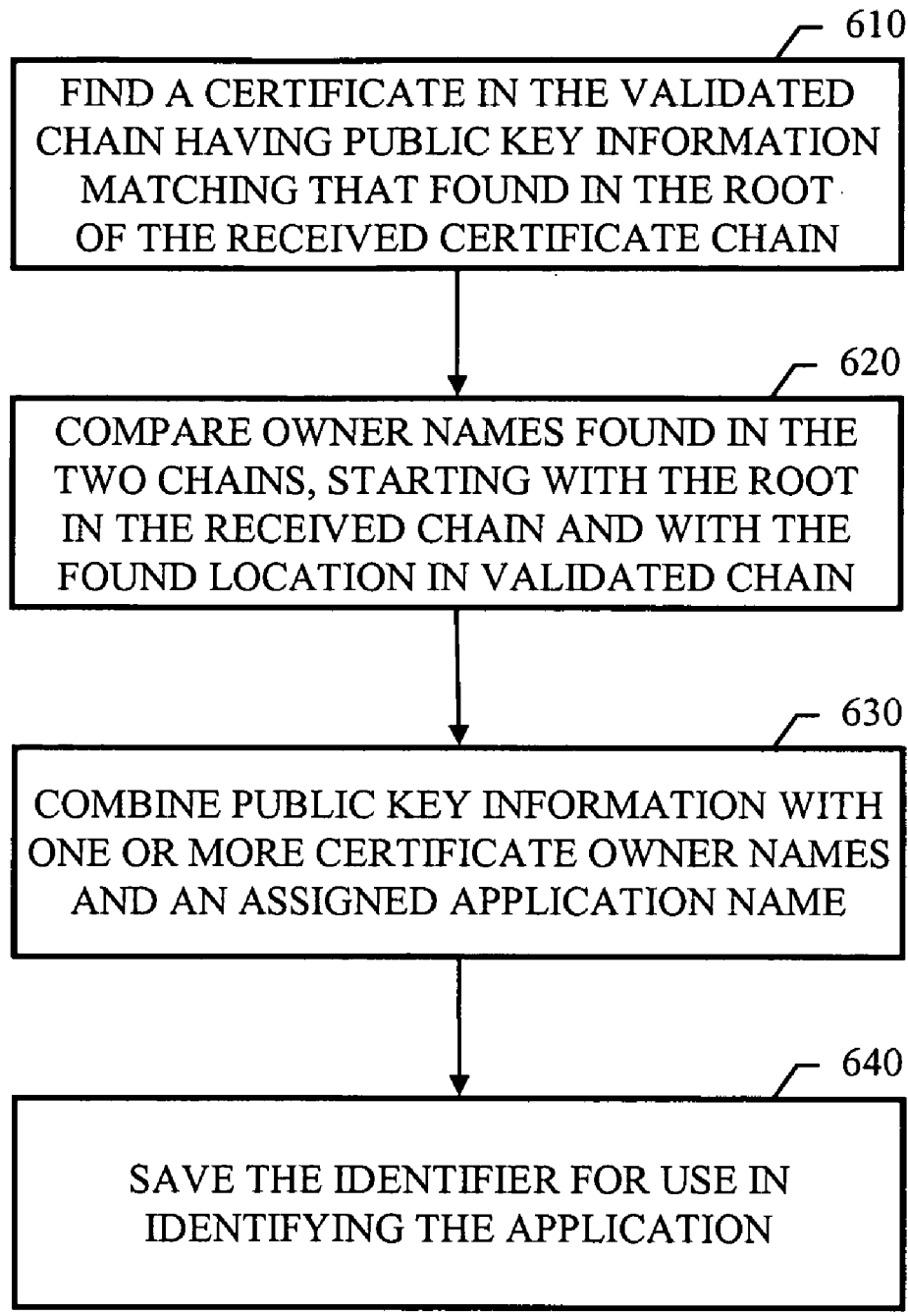
FIG. 6 shows another example process of creating an application identifier.

This process is now described in more detail in connection with FIG. 6. A certificate can be found in the validated chain, where this found certificate has public key information matching that found in the root of the received chain (610). Note that the validated chain should not be used in its original form since the validated chain can vary from one computing system to the next. Thus, the chain embedded in the application signature can be used, while also making sure this embedded chain is coherent with the chain computed at signature validation.

For example, referring again to FIG. 5, both the validated chain (520) and the received chain (510) have the same end entity cert (524, 514). The validated chain (520) is the certificate chain trusted on the current computing platform, and the received chain (510) is the certificate chain trusted on the application signer's computing platform. By looking for a certificate in the validated chain (520) with the same public key as the root (512) of the received chain (510), the portion of the validated chain (520) that corresponds to the received chain (510) can be delineated.

Referring again to FIG. 6, owner names found in the two chains can be compared, starting (or ending) with the root in the received chain and with the found location in the validated chain (620). The received chain and the corresponding portion of the validated chain can be checked to ensure that each pair of certificates in the same location on each chain have the same owner name. This can ensure that there is a current, trusted chain that matches the publisher chain entity-for-entity at each link in the chain. It should be noted that owner names (e.g., distinguished names) are compared rather than public keys since some of the certificates in the trusted chain may be renewals of certificates in the publisher chain.

If all of these checks succeed, public key information can be combined with one or more certificate owner names to form the application identifier (630). For example, the identifier can be a combination of three hash values: (1) the hash of the root's public key, (2) the hash of the canonicalized distinguished name(s) of one or more Intermediate Certificate Authorities (ICAs), and (3) the hash of the canonicalized distinguished name of the end entity. It should be noted here that the root's public key hash is cryptographically unique, and the distinguished names are unique within the domain of the CA. Furthermore, the combination can be performed in a wide variety of manners. For example, separate hashes can be concatenated together, or the separate inputs noted above can be provided together to form a single hash value.

Moreover, all the ICA names can be included, and these may be hashed separately or together. More or less inputs can be used to generate the application identifier (630). Various hashing algorithms can be used, as will be appreciated. Furthermore, in some implementations, hashing need only be used for a proper subset of the inputs, or potentially, no hashing need be used. For example, the distinguished name(s) can be used without hashing.

Other information can also be combined in forming the application identifier, including an application name assigned to the application (e.g., a human readable name given to the application by the author or publisher). It should be noted that application publishers can use the same public-private key pair when signing multiple different applications. Thus, the identifier generated from the certificate chain can be a publisher identifier, which can be further combined with other information to form an identifier specific to the current application. A publisher identifier can be used to identify a group of applications, and thus be treated as an application identifier in this larger sense. Alternatively, an application publisher can create separate certificates for each of its applications, thereby making the identifier computing from the certificate chain unique to the given application.

The application identifier can be saved for use in identifying the application (640). This can involve saving the identifier in long term storage device(s) or in volatile memory device(s). In any event, the saved identifier can be used to identify the application and facilitate services provided to the application, such as in the application execution environment described above.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer program's to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method for identifying an application having a corresponding digital signature and certificates, the method comprising:
   obtaining a first certificate chain from the certificates and a second certificate chain from a successful validation of the digital signature using the certificates;
   generating an identifier for the application based on one or more certificate owner names found in both the first certificate chain and the second certificate chain, wherein generating the identifier for the application comprises finding a location in one of the first and second certificate chains that corresponds to a root of the other of the first and second certificate chains; and
   wherein the obtaining and the generating are performed by at least one computer comprising a processor and a memory device.

2. The method of claim 1, wherein generating the identifier for the application comprises comparing the one or more certificate owner names found in both the first certificate chain and the second certificate chain, starting or ending with the root and the location.

3. The method of claim 1, wherein finding the location comprises finding a certificate in the one certificate chain having public key information matching that found in the root of the other certificate chain.

4. The method of claim 1, wherein generating the identifier for the application comprises using the first certificate chain to generate the identifier.

5. The method of claim 1, wherein generating the identifier for the application comprises combining the one or more certificate owner names with public key information corresponding to a root of the first certificate chain.

6. The method of claim 1, wherein generating the identifier for the application comprises combining public key information corresponding to a root of the first certificate chain, the one or more certificate owner names and an application name assigned to the application.

7. The method of claim 1, further comprising saving the identifier for use in identifying the application for application services provided by a cross-operating system runtime environment.

8. A non-transitory computer-readable medium encoding a computer program product operable to cause data processing apparatus to perform operations for identifying an application having a corresponding digital signature and certificates, the operations comprising:
obtaining a first certificate chain from the certificates and a second certificate chain from a successful validation of the digital signature using the certificates; and
generating an identifier for the application based on one or more certificate owner names found in both the first certificate chain and the second certificate chain, wherein generating the identifier for the application comprises finding a location in one of the first and second certificate chains that corresponds to a root of the other of the first and second certificate chains.

9. The non-transitory computer-readable medium of claim 8, wherein generating the identifier for the application comprises comparing the one or more certificate owner names found in both the first certificate chain and the second certificate chain, starting or ending with the root and the location.

10. The non-transitory computer-readable medium of claim 8, wherein finding the location comprises finding a certificate in the one certificate chain having public key information matching that found in the root of the other certificate chain.

11. The non-transitory computer-readable medium of claim 8, wherein generating the identifier for the application comprises using the first certificate chain to generate the identifier.

12. The non-transitory computer-readable medium of claim 8, wherein generating the identifier for the application comprises combining the one or more certificate owner names with public key information corresponding to a root of the first certificate chain.

13. The non-transitory computer-readable medium of claim 8, wherein generating the identifier for the application comprises combining public key information corresponding to a root of the first certificate chain, the one or more certificate owner names and an application name assigned to the application.

14. The non-transitory computer-readable medium of claim 8, the operations further comprising saving the identifier for use in identifying the application for application services provided by a cross-operating system runtime environment.

15. A system comprising:
a user interface device; and
one or more computers operable to interact with the user interface device and to perform operations comprising:
validating a digital signature for an application using certificates associated with the application;
obtaining a first certificate chain from the certificates and a second certificate chain from the validating; and
generating an identifier for the application based on one or more certificate owner names found in both the first certificate chain and the second certificate chain, wherein generating the identifier for the application comprises finding a location in one of the first and second certificate chains that corresponds to a root of the other of the first and second certificate chains.

16. The system of claim 15, wherein generating the identifier for the application comprises comparing the one or more certificate owner names found in both the first certificate chain and the second certificate chain, starting or ending with the root and the location.

17. The system of claim 15, wherein finding the location comprises finding a certificate in the one certificate chain having public key information matching that found in the root of the other certificate chain.

18. The system of claim 15, wherein generating the identifier for the application comprises using the first certificate chain to generate the identifier.

19. The system of claim 15, wherein generating the identifier for the application comprises combining the one or more certificate owner names with public key information corresponding to a root of the first certificate chain.

20. The system of claim 15, wherein generating the identifier for the application comprises combining public key information corresponding to a root of the first certificate chain, the one or more certificate owner names and an application name assigned to the application.

21. The system of claim 15 the one or more computers including a cross-operating system runtime environment and the operations further comprising saving the identifier for use in identifying the application for application services provided by the cross-operating system runtime environment.

22. The system of claim 15 wherein the one or more computers comprises one personal computer, and the personal computer comprises the user interface device.

23. A computer-implemented method, performed by at least one computer comprising a processor and a memory device, the method comprising:
identifying a digital signature corresponding to an application, wherein the digital signature includes digital certificates;
obtaining a first certificate chain from the digital certificates included with the digital signature, wherein the first certificate chain begins with a root certificate;
validating the digital signature for the application using the digital certificates;
obtaining a second certificate chain from a successful validation of the digital signature, wherein the second certificate chain begins with a root certificate;
finding a location in one of the first or second certificate chains that corresponds to the root certificate of the other of the first or second certificate chains;
comparing owner names found in the first certificate chain and the second certificate chain, starting with the found location and the corresponding root certificate; and
generating an identifier for the application using one or more of the owner names found in both the first certificate chain and the second certificate chain.

24. A non-transitory computer-readable medium encoding a computer program product operable to cause data processing apparatus to perform operations for identifying an application, the operations comprising:

identifying a digital signature corresponding to an application, wherein the digital signature includes digital certificates;

obtaining a first certificate chain from the digital certificates included with the digital signature, wherein the first certificate chain begins with a root certificate;

validating the digital signature for the application using the digital certificates;

obtaining a second certificate chain from a successful validation of the digital signature, wherein the second certificate chain begins with a root certificate;

finding a location in one of the first or second certificate chains that corresponds to the root certificate of the other of the first or second certificate chains;

comparing owner names found in the first certificate chain and the second certificate chain, starting with the found location and the corresponding root certificate; and generating an identifier for the application using one or more of the owner names found in both the first certificate chain and the second certificate chain.

25. A system comprising:

a user interface device; and one or more computers operable to interact with the user interface device and to perform operations comprising:

identifying a digital signature corresponding to an application, wherein the digital signature includes digital certificates;

obtaining a first certificate chain from the digital certificates included with the digital signature, wherein the first certificate chain begins with a root certificate;

validating the digital signature for the application using the digital certificates;

obtaining a second certificate chain from a successful validation of the digital signature, wherein the second certificate chain begins with a root certificate;

finding a location in one of the first or second certificate chains that corresponds to the root certificate of the other of the first or second certificate chains;

comparing owner names found in the first certificate chain and the second certificate chain, starting with the found location and the corresponding root certificate; and generating an identifier for the application using one or more of the owner names found in both the first certificate chain and the second certificate chain.

* * * * *